United States Patent [19]

Scola et al.

[11] Patent Number: 5,417,792
[45] Date of Patent: May 23, 1995

[54] METHOD FOR FABRICATING THERMOPLASTIC HIGH TEMPERATURE POLYMER GRAPHITE FIBER COMPOSITES

[75] Inventors: Daniel A. Scola, Glastonbury; John H. Vontell, Manchester, both of Conn.

[73] Assignee: United Technologies Corporation, Hartford, Conn.

[21] Appl. No.: 401,716

[22] Filed: Aug. 31, 1989

[51] Int. Cl.$^6$ .............................................. B32B 31/26
[52] U.S. Cl. ................... 156/307.1; 428/408; 428/473.5; 427/381; 528/347; 156/312; 156/331.1
[58] Field of Search ............... 156/307.4, 331.1, 307.1, 156/312; 427/381; 528/347, 339; 428/408, 473.5

[56] References Cited

U.S. PATENT DOCUMENTS

| | | | |
|---|---|---|---|
| 3,856,885 | 12/1974 | Furuya et al. | 260/862 |
| 3,879,349 | 4/1975 | Bilow et al. | 260/47 |
| 3,925,587 | 12/1975 | Park | 428/255 |
| 4,191,718 | 3/1980 | Mallick et al. | 264/26 |
| 4,197,339 | 4/1980 | Paul et al. | 427/370 |
| 4,276,344 | 6/1981 | Varma et al. | 428/260 |
| 4,560,742 | 12/1985 | Pater | 528/342 |
| 4,576,857 | 3/1986 | Gannett et al. | 428/260 |
| 4,579,782 | 4/1986 | Kumar et al. | 428/473.5 |
| 4,600,769 | 7/1986 | Kumar et al. | 528/322 |
| 4,675,379 | 6/1987 | Mikroyannidis et al. | 528/413 |
| 4,734,464 | 3/1988 | Biensan | 525/420 |
| 4,765,942 | 8/1988 | Christensen et al. | 264/510 |
| 4,769,197 | 9/1988 | Kromrey | 264/136 |
| 4,783,222 | 11/1988 | Druschke | 106/287.13 |
| 4,877,653 | 10/1989 | Vora et al. | 427/385.5 |
| 4,898,754 | 2/1990 | Christensen et al. | 427/369 |

*Primary Examiner*—Peter A. Nelson

[57] ABSTRACT

A pretreatment process for fabricating polyimide composites from prepreg, thereby reducing the formation of void producing or blister producing gases at elevated temperatures during a subsequent post cure cycle. The pretreatment process includes heating a prepreg to an elevated temperature and holding at said temperature for a period of time sufficient to achieve complete imidization of the prepreg but such that the material is still processable. Processes are also disclosed for the subsequent cure of the prepreg to form thermoplastic high temperature fiber reinforced composites.

24 Claims, No Drawings

METHOD FOR FABRICATING THERMOPLASTIC HIGH TEMPERATURE POLYMER GRAPHITE FIBER COMPOSITES

CROSS REFERENCE TO RELATED APPLICATIONS

This application is related to commonly assigned U.S. application Ser. Nos. 401,211, and now abandoned, and 401,196, and now abandoned, filed on even date herewith entitled, "Method for Fabricating Crosslinked Polyimide High Temperature Composites and Resins" and "Method for Fabricating Advanced Graphite Fiber Epoxy Composites", respectively.

TECHNICAL FIELD

The present invention relates to a means for fabricating fiber reinforced thermoplastic composites.

BACKGROUND ART

State-of-the-art processes to fabricate thermoplastic high temperature polymer/graphite composites includes a pretreatment imidization process for removing volatiles by advancing the resin/composite of laid-up uncured plies from room temperature to 200° C. before the application of pressure. This portion of the fabrication process is carried out independent of the consolidation of the uncured plies, typically in an autoclave or compression molding process. From room temperature to 200° C., most of the gas releasing reactions which are required for imidization and/or chain extension have occurred, and it is assumed that further processing at elevated temperatures serves primarily to consolidate the resin/fiber system, with a minimal amount of cure. This minimal amount of cure is assumed to have a benign affect on the fabrication process.

A typical pretreatment process consists of drying and imidizing freshly made prepreg in an oven cycle at 93° C. (200° F.) for one hour, 149° C. (300° F.) for an additional hour, and 204° C. (400° F.) for another two hours. The material is said to be capable of being put through the final stages of cure with no further evolution of volatiles, starting, if desired, with a press and/or mold preheated to 221° C. (430° F.).

Experience has shown, however, that composites fabricated in this manner can often range from low to high void and are more prone to blistering. These properties are undesirable because they tend to detract from the physical properties and thermal oxidative stability characteristics of these polymers. As such, overall yield and long term reliability of such composite systems is reduced as composite fabrication costs increase.

Thus, a long felt need exists to convert polyimide systems into stable materials by pretreating such systems in a process which prevents evolution of volatile gas products on further processing at the higher temperatures required for consolidation and final cure of such systems.

DISCLOSURE OF THE INVENTION

Accordingly, it is an object of the present invention to provide a means for fabricating stable polyimide composites which are capable of undergoing post cure at higher temperatures without the formation of void producing or blister producing gases.

Another objective is to produce composites and resin samples of excellent quality and reproducibility.

The method comprises heating a prepreg, said prepreg having reinforcing fibers and a reaction mixture, and said reaction mixture initially comprising a dianhydride or dianhydride derivative and a diamine, to an elevated temperature, said elevated temperature being greater than 204° C. (400° F.), for a period of time sufficient to achieve complete imidization of said resin or prepreg and form a stable but such that the material is still processable.

A further aspect of the disclosure includes methods for making a fiber reinforced thermoplastic polyimide composite article, wherein the article is substantially free of internal voids and surface blisters.

A first method for making the article comprises heating a plurality of plies of prepreg according to the above method to form plies of imidized prepreg, stacking the plies of imidized prepreg to form a laminated imidized prepreg, and curing the laminated imidized prepreg to form the article.

A second method for making the article comprises stacking a plurality of plies of prepreg to form a laminated prepreg, heating the laminated prepreg according to the method described above to form a laminated imidized prepreg, and curing the laminated imidized prepreg to form the article.

The foregoing and other features and advantages will become more apparent for the specification and claims.

BEST MODE FOR CARRYING OUT THE INVENTION

The reaction mixture of the present invention initially comprises a mixture of monomeric reactants. Suitable mixtures of monomeric reactants are those which react upon heating (in a condensation reaction) to form a fusible oligomeric imide intermediate wherein the intermediate may be consolidated by further heating to form a thermoplastic polyimide.

Preferably, the reaction mixture initially comprises a mixture of dianhydrides or dianhydride derivatives and diamines. For high temperature structural applications in the range from 300° C. to 350° C., the dianhydride Aryl [Ar'] and diamine [Ar] groups can be comprised of stiff aromatic structures. For lower temperature structural applications, e.g. 200° C. to 275° C. range, the Ar' and Ar groups may contain aromatic and aliphatic structures, ether linkages, and thioether linkages.

Dianhydrides or dianhydride derivatives exemplified in the present invention are typically represented by the following structures:

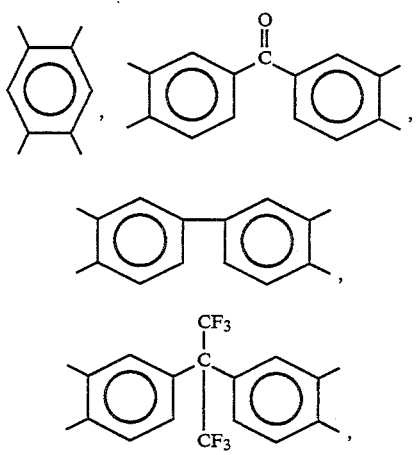

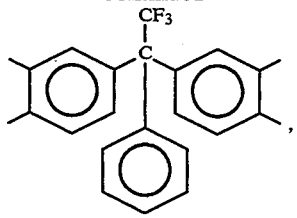

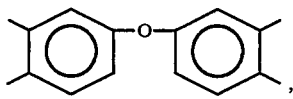

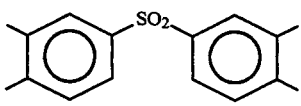

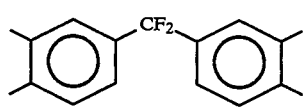

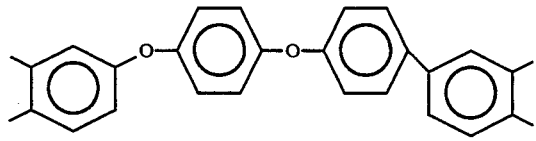

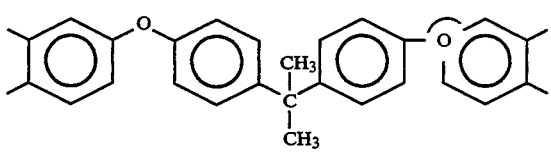

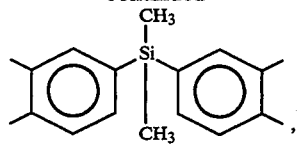

Diamines exemplified in the present invention are typically represented by the following structures:

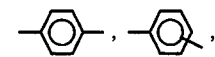

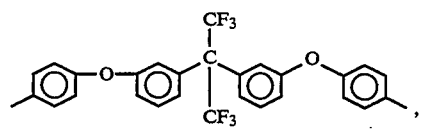

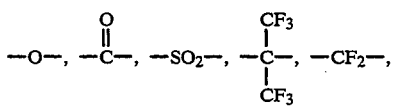

$-O-$, $-\overset{O}{\underset{}{C}}-$, $-SO_2-$, $-\overset{CF_3}{\underset{CF_3}{C}}-$, $-CF_2-$,

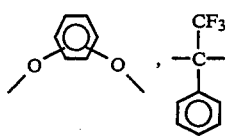

Intermediate polyamic acids are produced by a series of step-growth reactions at room temperature which control the molecular weight of the final polyimide product. Thermoplastic polyimides preferable to the present invention are illustrated below.

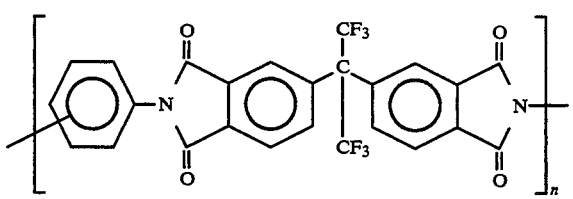

NR-150 B2

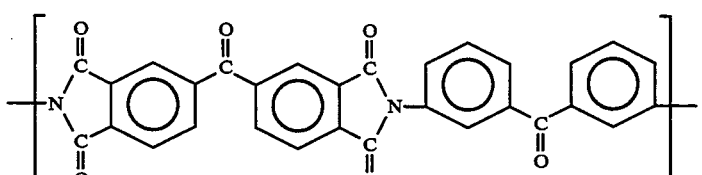

LARC TPI

-continued

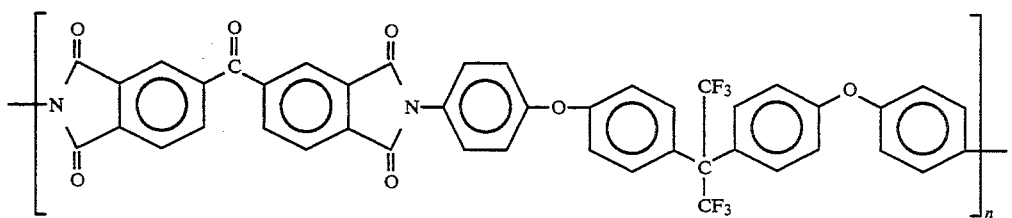

BTDA-4-BDAF
EYMYD L-20

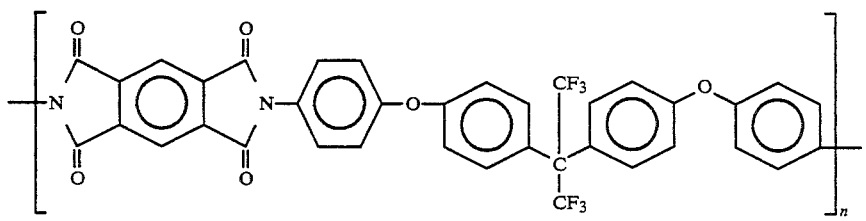

PMDA-4-BDAF
EYMYD L-30

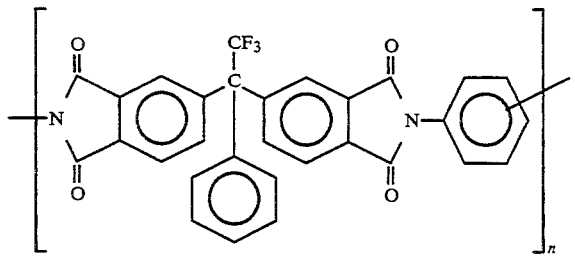

3F Polyimide

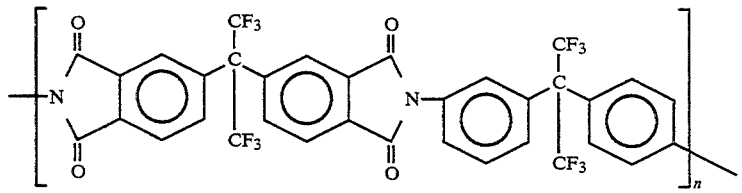

Sixef ® - 44

These thermoplastic polyimides are preferable because of their high temperature resistance and processability. Especially preferred is a reaction mixture initially comprising the diethyl or dimethyl ester of 4,4'-hexafluoroisopropylidine (biphthalic anhydride) or the corresponding tetra acid and a mixture of approximately 90% p-phenylene diamine and approximately 10% m-phenylene diamine to produce NR-150 B2, more commonly referred to as Avimid-N (DuPont de Nemours, E. I., Co., Wilmington, Del.), because it is the most stable high temperature thermoplastic polyimide currently available.

Processing aids may also be included in the reaction mixture.

The fiber reinforcement in the process of the present invention may comprise graphite fibers, carbon fibers, glass fibers, refractory ceramic fibers or silicon carbide fibers. Graphite fibers are preferred for applications in which high modulus fibers are required. Glass fibers are preferred in application in which lower modulus fibers are acceptable. Woven fiber cloth, unidirectional fiber tapes or fiber rovings are impregnated with the solution of reaction mixture and the solvent is evaporated to form the "prepreg". Composite articles made by the process of the present invention preferably include between about 30 volume percent and about 60 volume percent fiber reinforcement.

Single plies of prepreg may be pretreated according to the process of the present invention to form single plies of imidized prepreg and the plies of imidized prepreg may be laid up to form a laminated imidized prepreg. Alternatively, prepreg plies may be laid up to form laminated prepreg and the laminated prepreg may be pretreated according to the present invention to form a laminated imidized prepreg. In either case, the laminated imidized prepreg of the present invention may be cured by conventional autoclave or compression molding techniques to form a fiber reinforced thermoplastic polyimide matrix composite article that is substantially free of internal voids and surface blisters.

Heating the prepreg produces time dependent rheological and chemical changes in the reaction mixture. For example, thermal data for a pretreated Avimid-N resin uniprepreg is summarized in Table 1.

TABLE 1
THERMAL (DSC) BEHAVIOR OF PRETREATED NR-150B2 (AVIMID-N) PREPREG/RESIN
(RT -> 400° C., 10° C./min)

| Pretreatment | Endotherms | | Exotherm °C. |
|---|---|---|---|
| | Moisture Evolution, °C. | Softening Temp., °C. | |
| 200° C./1 hr | 90 | 260 | >350 |
| 250° C./1 hr | 90 | 285 | >350 |
| 275° C./1 hr | 60 | 308 | >350 |

The data reveals that as the pretreatment temperature increases, the softening temperature also increases (an increase to 260° C. and 308° C. after the 200° C. pretreatment and 275° C. pretreatment, respectively). This suggests that higher imidization temperature increases chain stiffness, a result believed to be related to the increased degree of imidization and increased molecular weight. An exotherm generated above 350° C. but below 450° C. for all pretreated samples further suggests that additional reactions occur on continued thermal treatment.

Complex viscosity data for the pretreated Avimid-N Resin is shown in Table 2.

TABLE 2
EFFECT OF PRETREATMENT TEMPERATURE ON COMPLEX VISCOSITY AVIMID-N PREPREG/RESIN

| Pretreatment | Temp. @ Initial Softening °C. | Initial Softening Viscosity Poise | Temp. @ midpoint of Viscosity lowering °C. |
|---|---|---|---|
| 200° C./1 hr | 170 | $3.3 \times 10^8$ | 200 |
| 250° C./1 hr | 220 | $3.5 \times 10^8$ | 280 |
| 275° C./1 hr | 250 | $5.9 \times 10^8$ | 305 |

The data also reveals that both the minimum viscosity temperature and minimum viscosity increase with an increase pretreatment temperature. This suggests that additional imidization occurs with increased temperature. Also, the lower temperature treatment tends to be inadequate because the quantity of volatiles released in subsequent post cure results in the formation of voids and blisters. throughout the composite.

As illustrated by the above example, the viscosity of the reaction mixture increases as the temperature increases. A critical temperature range for processing the prepreg according to the present invention involves balancing the increase in viscosity and the increase in the rate at which any additional imidization/chain extensions reactions occur to form the polyimide. This temperature range becomes critical to the process for forming void or blister-free thermoplastic polyimide composites.

The prepreg is heated at substantially ambient pressure to an elevated temperature within the critical range. The absence of external pressure to the system is important to retard the gas forming reactions. Elevated temperature means a temperature greater than 204° C. but no greater than the temperature required for the onset of cure. Preferably, the prepreg is heated from room temperature up to a temperature range from about 275° C. to about 330° C.

Above this temperature range, the material is no longer processable. By this is meant that the material is not capable of undergoing consolidation with minimal void or blister formation. This is partially due to an increase in viscosity as a function of an increase in molecular weight. Above a critical molecular weight, i.e. the molecular weight at which chain entanglements become important, flow becomes much more difficult as forces applied to one polymer chain become transmitted to and distributed among many other chains. Entanglements which can not relax behave essentially as crosslinks. As a result of this insufficient flow, further processing to produce substantially void or blister free composites (i.e. less than one percent) is not practical.

Below this temperature range, the viscosity of the reaction mixture is also too high to permit removal of volatile components within a reasonable time. As such, some volatiles often remain during the consolidation process. Therefore, the present invention utilizes a critical temperature range to ensure that imidization and other gas forming reactions are completed while forming a processable material, thus allowing for a maximum amount of volatiles to be removed within a reasonable processing time.

The resin or prepreg is maintained at this elevated temperature range for a period of time sufficient to achieve complete imidization of the prepreg. It is important, however, that the material remains processable for the above mentioned reasons. As such, a desirable hold time is between about 30 minutes to about 120 minutes. It is especially preferred that the hold time is about 60 minutes to about 90 minutes because such times have been shown to produce composites with excellent qualities and reproducibility.

The prepreg may be maintained at a temperature within the critical temperature range under subatmospheric pressure so that volatile impurities and volatile reaction products can be removed from the prepreg during the heating process. If such a condition is employed, it is preferred that the subatmospheric pressure correspond to a vacuum of greater than about 200 mm of mercury because this increases the rate of the gas forming reactions. It is particularly preferred that the subatmospheric pressure corresponds to a vacuum of between 500 mm of mercury and 600 mm of mercury because under these conditions the gas forming reactions are more complete.

The prepreg is subsequently cooled to produce a stabilized molding material, i.e. a partially cured material analogous to a conventional "B-stage" fiber prepreg material, which may be fully cured by further heating. Unlike conventional B-stage materials, the pretreated prepreg of the present invention is substantially free of volatile impurities and reaction products.

As noted above, laminated imidized fiber-reinforced prepreg of the present invention may be consolidated and cured according to convention at vacuum bag or compression molding procedures to form a composite article. For example, a laminated imidized fiber prepreg of the present invention may be consolidated and cured by heating the prepreg to a second temperature between about 316° C. and about 370° C. under superatmospheric pressure maintained for a time period between about 1 hour and 2 hours to form the fiber reinforced thermoplastic polyimide matrix composite article. It is preferred that a superatmospheric pressure between about 100 psi and about 2000 psi be applied to the prepreg during the heating.

Finally, the fiber reinforced thermoplastic polyimide matrix composite article so formed may be subjected to a conventional post cure, e.g. by maintaining the article at a temperature between about 330° C. and about 370°

C. for a time period between about 18 hours and about 24 hours.

The fiber reinforced thermoplastic polyimide matrix article formed by the process of the present invention is substantially free of internal voids and surface blisters.

While the process of the present invention is described primarily in terms of fiber reinforced polyimide matrix composite articles, it may be readily appreciated that the process provides similar advantages to particulate reinforced thermoplastic polyimide matrix articles and to nonreinforced thermoplastic polyimide articles.

The following example is given to illustrate the method of the present invention. It is not, however, intended to limit its generally broad scope.

EXAMPLE

T40R graphite fiber (available from Amoco Chemical Corp., Chicago, Ill.) reinforced Avimid-N (available from Dupont de Nemours, E. I., Co., Wilmington, Del.) was investigated to apply the thermal analysis and rheology data to two composite fabrication cycles.

The prepreg consisting of 35–40% by weight Avimid-N resin and 60–65% by weight T40R was made by conventional methods to yield a resin content of about 30–32% by weight after drying. More specifically, the T40R fiber was first rinsed in acetone to wet the fiber. The fiber was then wound around a rotating drum having a diameter of 15.2" to a width of 4.5". Avimid-N resin was dissolved in methanol to produce a dilute resin solution. The dilute solution was manually brushed onto the rotating drum to the desired wet weight percent and left to air dry to form the fiber reinforced resin impregnated prepreg. The prepregs were laid up and pretreated in air at ambient pressure at three levels 200° C./1 hr, 250° C./1 hr, and 275° C./1 hr and then subjected to cycles 1 or 2 as shown in Table 3.

TABLE 3

COMPOSITE PROCESSING CURE CYCLES
AVIMID-N COMPOSITES

CYCLE 1
Room Temp. -> 250° C. (482° F.), 8.3° C. (15° F.)/min, hold 60 min, apply 1000 psi at 250° C.;
250° C. (482° F.) -> 343° C. (650° F.)/min, 5.5° C. (10° F.)/min, hold 120 min, 1000 psi;
Post cure 370° C. for 24 hours.

CYCLE 2
Room Temp. -> 277° C. (530° F.), 11° C. (20° F.)/min, apply 1000 psi at 277° C.;
277° C. (530° F.) -> 365° C. (690° F.)/min, 5.5° C. (10° F.)/min, hold 120 min, 1000 psi;
Post cure 370° C. for 24 hours.

The composite data reveals that cycle 1 (state of the art process) with the various pretreatments did not successfully produce a void-free composite. Cycle 2, however, with the 275° C./1 hr pretreatment produced an excellent composite with very few voids. Results of both cycles are indicated in Table 4.

TABLE 4

EFFECT OF AVIMID-N PRETREATMENT
TEMPERATURE ON COMPOSITE QUALITY

| Prepreg Pretreatment | Composite Fabrication Cycle | Composite Quality Based on Optical Microscopy Cross Section |
|---|---|---|
| 200° C./1 hr | 1 | continuous large voids between plies, no voids within bundles, poor |
| 250° C./1 hr | 1 | large voids between plies, no voids within bundles, poor |
| 275° C./1 hr | 1 | large voids between plies, no voids within bundles, poor |
| 275° C./1 hr | 2 | very few voids between plies, no voids within bundles good |

These polymers make a significant advance in the field of high temperature polymers. Either as solid polymers, fibers, films or when incorporated into composites, they provide the strength at high temperatures, as desired for aerospace applications and the like. The polymers and composites made thereof have high flexural strengths, tensile strength, strain to failure, compression strength, shear strength, and flexural fatigue. Their excellent properties at high temperatures when processed at low temperatures and pressures give them a distinct advantage in this field of art.

Although this invention has been shown and described with respect to a preferred embodiment, it will be understood by those skilled in the art that various changes in the form and detail thereof may be made without departing from the spirit and scope of the claimed invention.

What is claimed is:

1. A pretreatment process for fabricating polyimide composites from prepreg by heating said prepreg, said prepreg having reinforcing fibers and a reaction mixture, and said reaction mixture initially consisting essentially of a dianhydride or dianhydride derivative and a diamine, to an elevated temperature wherein the improvement comprises:
   said elevated temperature being greater than 204° C. (400° F.), for a period of time sufficient to achieve complete imidization of said resin or prepreg but such that the material is still processable,
   thereby reducing the formation of void producing and blister producing gases at higher temperatures during a subsequent post cure cycle.

2. The pretreatment process according to claim 1 wherein said diamine is an aromatic diamine.

3. The pretreatment process according to claim 2 wherein said aromatic diamine comprises approximately 90% p-phenylene diamine and approximately 10% m-phenylene diamine.

4. The pretreatment process according to claim 1 wherein said dianhydride is a fluorinated aromatic dianhydride.

5. The pretreatment process according to claim 1 wherein said reaction mixture comprises the diethyl or dimethyl ester of 4,4'-hexafluoroisopropylidine (biphthalic anhydride) and a mixture of approximately 90% p-phenylene diamine and approximately 10% m-phenylene diamine.

6. The pretreatment process according to claim 1 wherein said elevated temperature is between about 275° C. and about 330° C.

7. The pretreatment process according to claim 1 wherein said time is between about 30 minutes and about 120 minutes.

8. The pretreatment process according to claim 1 wherein said prepreg is heated to an elevated temperature between about 275° C. and about 330° C. for a period of time between about 30 minutes and about 120 minutes.

9. A process for fabricating thermoplastic polyimide high temperature polymer/graphite fiber reinforced composite articles which comprises the steps of:
heating a plurality of plies of resin or prepreg, said plies of resin or prepreg having reinforcing fibers and a reaction mixture, and said reaction mixture initially consisting essentially of a dianhydride or dianhydride derivative and a diamine to an elevated first temperature, said elevated first temperature being greater than 204° C. (400° F.), for a period of time sufficient to achieve complete imidization of said prepreg but such that the material is still processable;
stacking plies of imidized prepreg to form a laminated imidized prepreg;
heating the laminated imidized prepreg under super-atmospheric pressure to a second temperature for a second period of time, to form the crosslinked polyimide high temperature polymer/graphite fiber composite article by consolidating the plies and crosslinking the imide intermediate;
wherein the composite article so formed is substantially free of internal voids and surface blisters.

10. The process according to claim 9 wherein said reaction mixture comprises the diethyl or dimethyl ester of 4,4'-hexafluoroisopropylidine (biphthalic anhydride) and a mixture of approximately 90% p-phenylene diamine and approximately 10% m-phenylene diamine.

11. The process according to claim 9 wherein said elevated first temperature is between about 275° C. and about 330° C.

12. The process according to claim 9 wherein said first time is between about 30 minutes and about 120 minutes.

13. The process according to claim 9 wherein said resin or prepreg is heated to an elevated first temperature between about 275° C. and about 330° C. for a period of time between about 30 minutes and about 120 minutes.

14. The process according to claim 9 wherein said prepreg is heated to a second temperature between about 316° C. and about 370° C. for a period of time between about 1 hour and about 2 hours.

15. The process according to claim 9 wherein said resin or prepreg is heated to an elevated first temperature between about 275° C. and about 330° C. for a period of time between about 30 minutes and about 120 minutes and said or prepreg is further heated to a second temperature between about 316° C. and about 370° C. for a period of time between about 1 hour and about 2 hours.

16. A process according to claim 9 additionally comprising the step of:
heating the thermoplastic polyimide high temperature polymer/graphite fiber reinforced composite to a temperature between about 330° C. and about 370° C. for a time period between about 8 hours and about 24 hours to form a post cured thermoplastic polyimide high temperature polymer/graphite fiber reinforced composite,
wherein said composite is substantially free of internal voids and surface blisters.

17. A process for fabricating thermoplastic polyimide high temperature polymer/graphite fiber reinforced composite articles which comprises the steps of:
stacking a plurality of plies of resin or prepreg, said plies of resin or prepreg having reinforcing fibers and a reaction mixture, and said reaction mixture initially consisting essentially of a dianhydride or dianhydride derivative and a diamine, to form a laminated prepreg;
heating the laminated prepreg in the absence of pressure to an elevated first temperature, said elevated first temperature being greater than 204° C. (400° F.), for a period of time sufficient to achieve complete imidization of said prepreg but such that the material is still processable to form a laminated imidized prepreg; and
heating the laminated imidized prepreg under super-atmospheric pressure to a second temperature for a second period of time, to form the thermoplastic polyimide high temperature polymer/graphite fiber reinforced composite article by consolidating the plies and curing the imide intermediate;
wherein the composite article so formed is substantially free of internal voids and surface blisters.

18. The process according to claim 17 wherein said reaction mixture comprises the diethyl or dimethyl ester of 4,4'-hexafluoroisopropylidine (biphthalic anhydride) and a mixture of approximately 90% p-phenylene diamine and approximately 10% m-phenylene diamine.

19. The process according to claim 17 wherein said elevated first temperature is between about 275° C. and about 330° C.

20. The process according to claim 17 wherein said first time is between about 30 minutes and about 120 minutes.

21. The process according to claim 17 wherein said prepreg is heated to an elevated first temperature between about 275° C. and about 330° C. for a period of time between about 30 minutes and about 120 minutes.

22. The process according to claim 17 wherein said prepreg is heated to a second temperature between about 316° C. and about 370° C. for a period of time between about 1 hour and about 2 hours.

23. The process according to claim 17 wherein said or prepreg is heated to an elevated first temperature between about 275° C. and about 330° for a period of time between about 30 minutes and about 120 minutes and said prepreg is further heated to a second temperature between about 316° C. and about 370° C. for a period of time between about 1 hour and about 2 hours.

24. A process according to claim 17 additionally comprising the step of:
heating the thermoplastic polyimide high temperature polymer/graphite fiber reinforced composite to a temperature between about 330° C. and about 370° C. for a time period between about 8 hours and about 24 hours to form a post cured thermoplastic polyimide high temperature polymer/graphite fiber reinforced composite,
wherein said composite is substantially free of internal voids and surface blisters.

* * * * *